March 29, 1966  J. E. BACLAWSKI  3,243,619
ROTOR PROTECTIVE COVER FOR A DYNAMOELECTRIC MACHINE
Filed Nov. 1, 1963
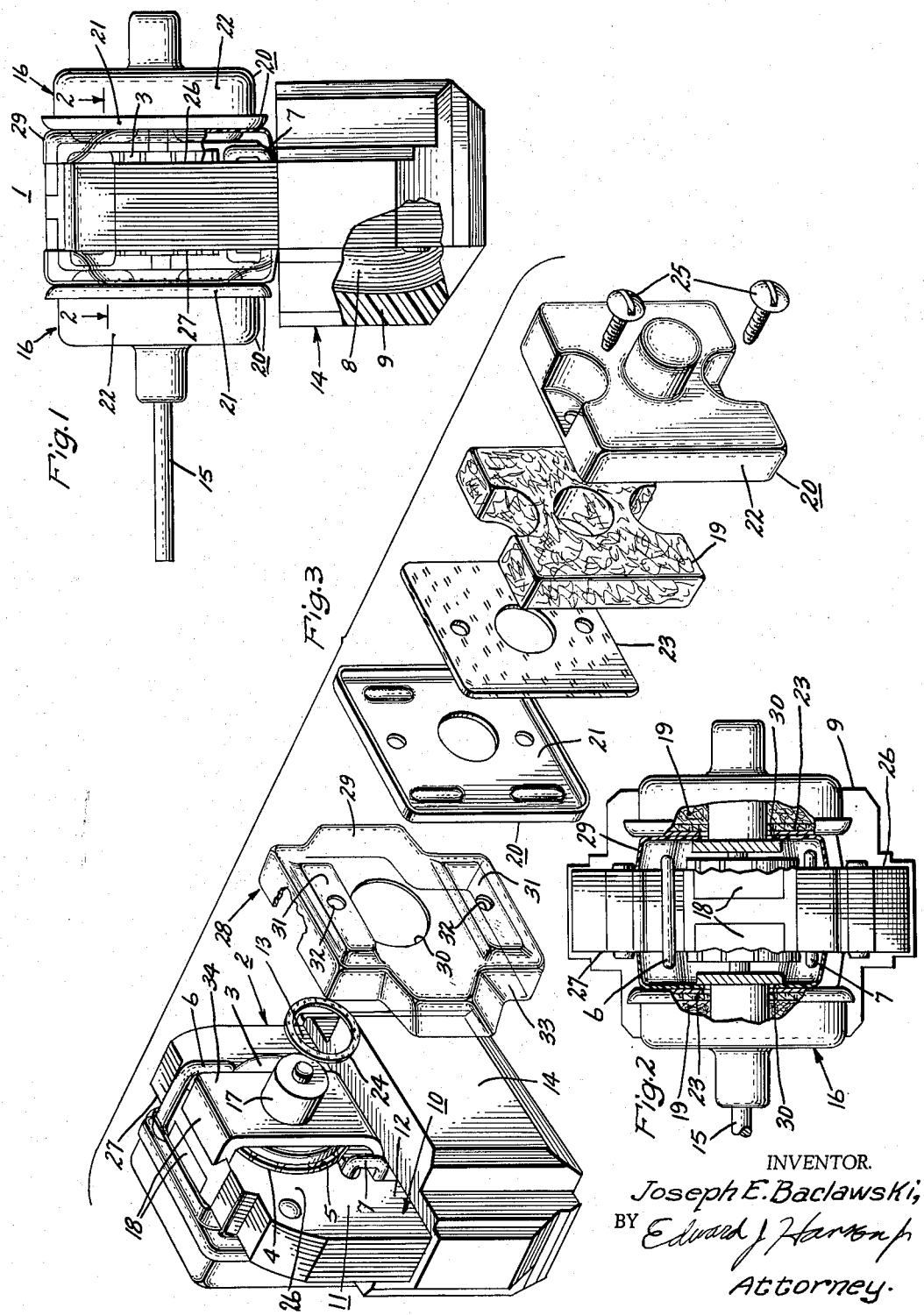
INVENTOR.
Joseph E. Baclawski,
BY
Attorney.

United States Patent Office 3,243,619
Patented Mar. 29, 1966

3,243,619
ROTOR PROTECTIVE COVER FOR A DYNAMOELECTRIC MACHINE
Joseph E. Baclawski, Fort Wayne, Ind., assignor to General Electric Company, a corporation of New York
Filed Nov. 1, 1963, Ser. No. 320,674
7 Claims. (Cl. 310—88)

My invention relates to dynamoelectric machines and more particularly to small motors for use in applications where dust and other foreign particles may be present in the surrounding environment.

In certain applications for small electric motors, it is desirable, if not necessary, that the rotor be enclosed from the surrounding atmosphere. For example, fractional horsepower motors are used today in many domestic refrigerators to drive air circulating fans, and both to protect the motor itself and to avoid hazard, it is necessary that the rotor be effectively separated from the surrounding atmosphere. These motors are usually mounted in a hollow refrigerator wall containing insulating material. This insulating material usually contains a great many very small particles as well as dust and other foreign material. Many factors cause these particles to move about. Among these factors are the rotation of the rotor, the air currents resulting from the motor's own heat and the constant day to day opening and closing of the refrigerator door which shakes and vibrates the refrigerator. Since the motor is expected to operate over an extended period of time, refrigerators being used upward of 15 to 20 years, particles which collect on the rotor and also on the inner face of the stator bore can build up and reduce the efficiency of the motor. They may even build up to such an extent that they completely clog the bore of the stator about the rotor, stalling the motor and causing it to burn out. This not only causes the breakdown of the refrigerator, it also presents the likelihood of fire and personal hazard.

The solution heretofore generally used by fractional horsepower motor manufacturers for these applications where the rotor must be enclosed from the surrounding atmosphere is to encase the motor completely with a metal enclosure. In other words, a motor housing surrounds the rotor and the stator with no openings whatsoever except for the output shaft. These motors are known as totally enclosed motors and they do result in acceptable protection. But they are quite expensive as compared to an open motor and in addition they have several inherent disadvantages. Their size and bulk is increased as compared to an open motor, which sometimes makes them more difficult to use where space is at a premium. Also, the heat generated in the windings cannot be dissipated into the large air mass of the insulating wall but is confined. With the lack of adequate heat dissipation the motor temperature necessarily rises and consequently the life of the winding insulation is adversely affected. Also, the lubrication properties of the oil supplied to the shaft bearings are reduced due to the higher temperature of operation. All of these factors increase the heating of the motor, accelerating its ultimate failure.

Accordingly, it is a principal object of my invention to provide a new and improved motor for use in applications where it is desired to protect the rotor from dust and other foreign particles in the surrounding environment.

It is another object of my invention to provide a new and improved motor wherein the rotor is effectively protected from harmful matter carried by the atmosphere around the motor, but yet the motor winding is exposed to the surrounding atmosphere for direct heat transfer and the motor is not increased in size or bulk.

A further object of my invention is to provide a new and improved motor for use in applications requiring an enclosed rotor, which is cheaper to manufacture than a totally enclosed motor of equivalent output.

Still another object of my invention is to provide a new and improved motor wherein both the rotor and the bearings journaling the rotor shaft are enclosed and protected from harmful matter carried by the atmosphere around the motor.

Briefly stated, in accordance with one form of my invention, I provide an electric motor including a rotor and a stator. The rotor is positioned in a bore which extends through the stator and the rotor is exposed at each end of the bore at a respective side face of the stator. A pair of bearing support brackets are mounted on the stator and extend over the opposite ends of the bore. Bearings are secured in the brackets and journal the rotor shaft to mount the rotor in the bore. By my invention, a pair of dish shaped protective covers are positioned over the brackets and engage the opposite sides of the stator to cover the ends of the bore and protect the rotor. The covers are preferably held in place on the brackets and against the sides of the stator by lubricant reservoirs which are also carried by the brackets. These reservoirs, besides securing the covers, also serve to supply lubricant to the bearings.

In order to facilitate a secure engagement of the covers which is desirable due to possible vibration of the motor in operation, and to prevent the warping and misalignment of the parts of the bearing assembly, the covers are preferably constructed of flexible material. To secure them against the sides of the stator their peripheral flanges are preferably dimensioned, i.e., made large enough, so that the cover is flexed when it is urged against the face and the side of the stator by its mounting. This assures that the edge of the cover will conform to the surface of the stator to provide a satisfactory enclosure. A small transverse rib may also be provided, at each end of the covers where the mounting screws pass through, to increase the flexing pressure of the covers.

The subject matter which I regard as my invention is particularly pointed out and distinctly claimed in the concluding portion of this specification. My invention, however, both as to organization and method of operation, together with further objects and advantages thereof, may be best understood by reference to the following description taken in conjunction with the accompanying drawing in which:

FIG. 1 is a side elevational view of a small electric motor which embodies my invention in one form thereof, the view is partially broken away to show details;

FIG. 2 is a top view partly in section taken along the line 2—2 of FIG. 1; and

FIG. 3 is an exploded perspective view illustrating the relationship of the cover and the bearing assembly with the rest of the motor.

Referring now to the drawing, I have shown therein an electric motor 1 which embodies my invention in one form thereof. The motor 1 is of the shaded pole type and it includes a stator 2 and a rotor 3. The rotor 3 is positioned in the bore 4 of the stator between a pair of oppositely disposed stator poles 5, and the rotor is activated during operation by means of the magnetic flux passing between the poles 5. Suitable shading coils 6 and 7 are provided at the trailing ends of the stator poles to provide starting torque and to aid in producing running torque.

The magnetic flux for exciting the rotor 3 is provided by an electrical winding or coil 8. The coil 8 is incapsulated in an outer imperforate covering 9 and thus the motor is electrically enclosed.

As clearly seen in FIGS. 1, 2 and 3 the stator 2 is formed of a plurality of stacked laminations of magnetic material. It includes a generally U-shaped yoke 10 comprising an upper bight section 11 in which the bore 4 is located, and opposed depending legs 12 and 13. The lower ends of the legs are bridged by a winding section 14 comprising a winding leg of the stator and the coil 8 which is mounted on the winding leg. This stator is of the type disclosed and claimed in M. D. Tupper's Patent 3,024,377. The rotor 3 is also formed of a plurality of stacked laminations of magnetic material, and it has a squirrel cage winding of conductive material provided in slots formed therein.

Referring now to FIGS. 1 and 2, it will be noted that the rotor 3 is mounted on an output shaft 15. This shaft is supported at opposite ends of the rotor by the identical bearing assemblies 16, the only difference between the two assemblies being that the left hand one includes an open cap instead of a closed end cap to accommodate the output extension of the shaft. Both of the bearing assemblies include a central bearing member 17 journaling the shaft 15 for rotation (see FIG. 3). The respective bearing members 17 are supported from the stator yoke 10 by means of suitable brackets 18. The brackets are generally U-shaped in configuration with the legs of the U being attached to the bight 11 of the stator yoke 10, and with the bight or center portion of the U extending across the end of the stator bore and supporting the associated bearing 17. The brackets 18 may be attached to the stator in any suitable manner, and in the illustrated embodiment are secured thereto by a non-shrinking, thermosetting resinous material.

In order to lubricate the bearing 17, each bearing assembly 16 includes a lubricant reservoir having a pad 19 which is impregnated with a suitable grade of lubricating oil. The pad 19 is enclosed by a casing 20 which is formed by an outer cap member 22 and an inner closing member 21. An oil seal or gasket 23 is located between the lubricant pad 19 and the inner closing member 21. Washer 24 is also an oil seal. The lubricant reservoirs are attached to the respective brackets 18 by screws 25 which pass through the casings 20 and secure the casings against the brackets 18.

In the stator, the faces 26, 27 at the opposite sides of the bore are mirror images of one another. They would be identical except the shading coils 6, 7 are in opposite corners when the faces are viewed from their respective sides of the stator. For example, shading coil 6 appears at the top right corner of face 26 when it is viewed as in FIG. 3, while this coil appears at the top left corner of face 27 when it is viewed from the other side of the stator.

In order to enclose the rotor against the atmosphere surrounding the motor 1, I have provided a pair of dish shaped flexible covers 28. These dish shaped covers 28 are positioned over the brackets 18 and engage the opposite sides of the stator. They engage the stator around the periphery of the bore 4 and thereby enclose the bore and the rotor. Also, the inner ends of the bearings 17 are enclosed since they protrude into the space between the brackets and the motor. The outer ends of the bearings are covered by the lubricant reservoirs and thus with my improved structure, both the rotor and the bearings are enclosed by the provision of the covers 28.

Each cover 28 has an outer or base wall 29 which has a central aperture 30 (see FIG. 3) adapted to fit around one of the bearings 17 when the covers are incorporated in the motor. The walls 29 also include a pair of transverse ribs 31 in which respective screw receiving apertures 32 are formed. The function of the ribs 31 when the covers 28 are mounted will be explained below. The covers 28 are preferably made of a flexible material. A plastic material such as a synthetic resinous material, which is available from General Electric Company under its registered trademark "Lexan," may be advantageously used in the illustrated embodiment. The covers have somewhat cross shaped configurations with the arms slightly offset. Because the two stator faces 26, 27 are, as previously stated, mirror images of one another, the covers are also mirror images with the offset arms being appropriately positioned to enclose the shading coils 6 and 7. To avoid gaps and difficulties in engagement between the covers and the stator, it is desirable to enclose the shading coils and their apertures within the covers 28, rather than having the covers pass across the shading coils.

Each cover 28 has a flange 33 coextensive with and extending from the periphery of the outer base wall 29. The portions of the flange at the tips of the vertical arms as seen in FIG. 3 extend perpendicularly from the outer wall. The portions of the flange 33 extending from the horizontal arms of the cover 28 as seen in FIG. 3 are slightly divergent as they extend from the outer wall. In each cover the flange 33 extends away from the outer base wall 29 a distance greater than the distance between the outer base wall 29 and the stator face when the cover is mounted on the stator 2. Thus, as the motor is assembled and the cover 28 is clamped between the lubricant reservoir 20 and the outer surface 34 of the bracket 18, the divergent portions of the flange are caused to spread as they engage with and are forced against the face of the stator. This action is augmented by the ribs 31 which are slightly raised in the outer wall 29 of the cover. The perpendicular portions of the flange 33 fit over the legs of the bracket 18 as shown in FIG. 1.

As the flange of each cover spreads when it is pressed against the associated face of the stator 2, it tends to flexibly conform to and press against the stator face and draw in against the legs of the bracket 18. Because the covers are formed of flexible material, any bending or deformation takes place in them rather than in the brackets or other parts of the bearing assemblies. Thus the provision of the covers does not interfere with the maintenance of the proper air gaps and bearing alignment in the motor.

With the covers being pressed against the stator and their edges conforming to it, foreign particles such as dust are effectively excluded from the stator bore and rotor. It will be observed that the seal is not 100% air tight in my preferred embodiment because the cover has some rigidity and is only pressingly engaged against the sides of the stator 2 and its conformity to these sides is not perfect. However, the exclusion of foreign particles in the surrounding atmosphere is substantially complete.

It can also be seen that when the lubricant reservoirs 20 are secured over the covers 28, they cooperate in the total enclosing of the bearings. In other words, the lubricant reservoirs 20 cover the outer end of each bearing while the cover 28 fits over the inner end. Thus the bearings as well as the rotor are enclosed in my illustrated embodiment.

From the above, it will now be seen that I have provided a motor having an enclosed rotor yet not requiring an overall motor casing. Because the winding is enclosed by the encapsulating covering 9, the motor is thus both electrically and mechanically enclosed. This motor can thereby operate reliably in moist and dirty atmospheres.

Another advantage of my new and improved motor is that direct heat exchange between the winding and the atmosphere surrounding the motor is accomplished while at the same time harmful particles carried by that atmosphere are excluded from the operating parts of the motor. Thus, the heat exchange problems which may affect the insulation life and the lubricant properties in the ordinary totally enclosed motor are not present in my improved motor. My motor is much smaller in size than a comparable totally enclosed motor of the same rating using the conventional metallic housing. In addition to the important features already recited, due to the elimination of the motor shell and the other special parts, my motor is much less expensive to manufacture than a conventional totally enclosed motor of equivalent rating.

While in accordance with the patent statutes, I have described what at present is considered to be the preferred embodiment of my invention, it will be obvious to those skilled in the art that numerous changes and modifications may be made therein without departing from the invention and it is therefore aimed in the appended claims to cover all such equivalent variations as fall within the true spirit and scope of the invention.

What I claim as new and desire to secure by Letters Patent of the United States is:

1. A mechanically enclosed dynamoelectric machine comprising a rotor having a shaft, a stator having a plurality of poles forming a rotor receiving bore, an excitation winding mounted on said stator, a pair of bearing support brackets mounted on said stator and extending over the opposite ends of said bore, bearing means carried by said brackets and journaling said shaft to mount said rotor in said stator bore, a lubricant reservoir including an outer casing mounted on each of said brackets around said bearing means for supplying lubricant thereto and a pair of dish shaped protective cover members positioned over said brackets and engaging the opposite sides of said stator to cover the ends of said bore, said casings of said lubricant reservoirs fitting over said covers and holding said covers in place on said brackets, whereby said covers are securely retained over the ends of said bore to protect said rotor for service in contaminated atmospheres.

2. An electrically and mechanically enclosed motor comprising a rotor having a shaft, a stator having a plurality of poles forming a rotor receiving bore, an excitation winding mounted on said stator, said winding being encapsulated in an imperforate covering, a pair of bearing support brackets mounted on said stator and extending over the opposite ends of said bore, bearing means carried by said brackets and journaling said shaft to mount said rotor in said stator bore, a pair of dish shaped protective cover members positioned over said brackets and engaging the opposite sides of said stator to cover the ends of said bore, and a lubricant reservoir including an outer casing mounted on each of said brackets around said bearing means for supplying lubricant thereto, said casing fitting over said covers and holding said covers in engagement with the opposite sides of said stator to thereby enclose said rotor.

3. In an electric motor having a rotor, a shaft mounting said rotor, a stator having a bore receiving said rotor, and a bearing assembly mounted on said stator and including a bearing journaling said rotor shaft, with said rotor being exposed on at least one side of said stator, the improvement comprising a flexible cover mounted over the exposed end of said rotor, said cover being dish shaped with an outer base wall and a peripheral flange, said outer base wall including an aperture fitting around said bearing and said cover being mounted on said stator by said bearing assembly, said flange extending inwardly from said bearing assembly and engaging said stator around the periphery of said bore, said flange being pressed against the face of said stator so that it conforms to the face of said stator to protect against the entry of foreign particles.

4. A motor according to claim 3 wherein the cover is made of a flexible plastic material and has at least one transverse rib in its outer base wall to increase the conforming pressure when said cover is pressed against the side of said stator.

5. A motor according to claim 3 wherein the depth of said flange is greater than the distance between said bearing and the face of said stator thereby to cause flexing of said flange against the face of said stator.

6. In an electric motor having a rotor, a shaft mounting said rotor, a stator having a bore receiving said rotor, a pair of bearing assemblies mounted on said stator and journaling said rotor shaft, the improvement comprising a pair of flexible covers mounted over each end of said bore by an associated bearing assembly, said covers being dish shaped with an outer base wall having a flange extending inwardly from said bearing assembly and engaging said stator around the periphery of said bore, said flange being pressed against the face of said stator and being flexed by the mounting pressure so that it conforms to and presses against the face of said stator to protect against the entry of foreign particles into said bore, the two faces of said stator being substantially mirror images and the two covers being substantially corresponding mirror images.

7. In an electric motor, a stator including a laminated magnetic yoke section having a pair of spaced apart leg portions and a bight portion joining the one end of said leg portions together, a winding section bridging said yoke leg portions, a coil mounted in said winding section and encapsulated in an imperforate casing, a rotor receiving bore through said bight section, a rotor disposed within said bore, a shaft carrying said rotor, a bearing support bracket mounted on said bight portion of said yoke at each end of said bore, a bearing carried by said bracket and journaling said rotor shaft to mount said rotor, a dish shaped flexible cover mounted over said bracket and around the associated bearing to cover said bore and the innermost end of said bearing, the outer periphery of said dish shaped cover extending toward the adjacent surfaces of said bight portion, a lubricant reservoir including an outer casing mounted on said bracket around said bearing for supplying lubricant thereto and enclosing the outer end of said bearing, the casing of said reservoir engaging said dish shaped cover and clamping it against said bracket and against said adjacent surfaces of said bight portion, said cover being distorted to flexibly conform to and press against said stator bight portion around said bore thereby to enclose said rotor and the innermost end of said bearing.

References Cited by the Examiner

UNITED STATES PATENTS

| | | | |
|---|---|---|---|
| 2,450,982 | 10/1948 | O'Brien | 310—86 |
| 2,606,083 | 8/1952 | Kitto | 310—89 |
| 2,615,937 | 10/1952 | Ludwig | 310—88 |
| 2,752,517 | 6/1956 | Von Delden | 310—89 |

ORIS L. RADER, *Primary Examiner.*

J. W. GIBBS, *Assistant Examiner.*